United States Patent
Bekkerman et al.

(10) Patent No.: US 9,945,689 B2
(45) Date of Patent: Apr. 17, 2018

(54) LOCATION REFERENCING FOR ROADWAY FEATURE DATA

(71) Applicant: HERE Global B.V., Veldhoven (NL)

(72) Inventors: Boris Bekkerman, Highwood, IL (US); Joe Ciprian, Bloomingdale, IL (US); Johannes Glossner, Freising (DE)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 14/835,059

(22) Filed: Aug. 25, 2015

(65) Prior Publication Data

US 2017/0059352 A1    Mar. 2, 2017

(51) Int. Cl.
| | |
|---|---|
| G08G 1/0967 | (2006.01) |
| G01C 21/26 | (2006.01) |
| G01C 21/36 | (2006.01) |
| G08G 1/0969 | (2006.01) |
| G09B 29/00 | (2006.01) |
| G08G 1/01 | (2006.01) |
| G09B 29/10 | (2006.01) |

(52) U.S. Cl.
CPC ......... *G01C 21/3694* (2013.01); *G01C 21/26* (2013.01); *G08G 1/0108* (2013.01); *G08G 1/0967* (2013.01); *G08G 1/0969* (2013.01); *G09B 29/003* (2013.01); *G09B 29/106* (2013.01)

(58) Field of Classification Search
None
See application file for complete search history.

(56) References Cited

U.S. PATENT DOCUMENTS

| | | |
|---|---|---|
| 6,324,468 B1 | 11/2001 | Meis et al. |
| 6,892,133 B2 | 5/2005 | Kornhauser et al. |
| 2001/0056325 A1* | 12/2001 | Pu ................ G01C 21/26 701/533 |
| 2005/0159884 A1* | 7/2005 | Suzuki ............ G01C 21/36 701/437 |

(Continued)

FOREIGN PATENT DOCUMENTS

| | | |
|---|---|---|
| CN | 101673461 | 3/2010 |
| EP | 2500887 A1 | 9/2012 |
| WO | WO2009145832 | 12/2009 |

OTHER PUBLICATIONS

Lv Wei-Feng et al., Research of Dynamic Location Referencing Method Based on Intersection and Link Partition, Oct. 7, 2008, Beihang University (Continued)

*Primary Examiner* — Lail A Kleinman
(74) *Attorney, Agent, or Firm* — Lempia Summerfield Katz LLC

(57) ABSTRACT

A method and apparatus for location referencing roadway data. A server determines a roadway event; the roadway event including a roadway description and a roadway location. The server then generates a roadway message. The roadway message includes the roadway description and a roadway path. The roadway path includes a LinkID set, a length of the roadway event, and an offset from a reference node of a starting link. The LinkID set includes at least the starting link. The server then broadcasts the roadway message. A device receives the data. The device decodes and displays the data.

19 Claims, 9 Drawing Sheets

(56) References Cited

U.S. PATENT DOCUMENTS

| | | | | |
|---|---|---|---|---|
| 2007/0229311 | A1* | 10/2007 | Bowman | G01C 21/367 340/995.14 |
| 2008/0281508 | A1* | 11/2008 | Fu | G01C 21/3647 701/533 |
| 2009/0248286 | A1* | 10/2009 | Nagase | G08G 1/096805 701/118 |
| 2009/0319188 | A1* | 12/2009 | Otto | G06F 17/30241 701/300 |

OTHER PUBLICATIONS

Technologu and Licensing Overview, AGORA-C, 2010, VIA Licensing.
The OpenLR Initiative, Oct. 19, 2009, OpenLR.
TPEG—What is it all about?, Jan. 27, 2014, TISA.
Nattapon Klakhaeng et al: "Uniform location referencing standard for raod traffic data in Thailand," Intelligent Transport Systems Telecommunications, (ITST), Oct. 20, 2009, pp. 149-152.
PCT International Search Report and Written Opinion of the International Searching Authority dated Dec. 9, 2016 for corresponding PCT/EP2016-070127.
Petr Bures: "The architecture of traffic and travel information system based on protocol TPEG" Telematics and Information Systems, ACM, Jun. 3, 2009, pp. 1-8.
Schneebauer C et al: "On-the-Fly Location Referencing Methods for Establishing Traffic Information Services" Feb. 1, 2007, pp. 14-21.

* cited by examiner

LOCATION REFERENCING FOR ROADWAY FEATURE DATA

FIELD

The following disclosure relates to vehicle transportation systems and transit related applications, and more specifically to describing locations and extents of roadway features in relation to an application embedded roadway map.

BACKGROUND

End users and service providers need up to date map content, which accurately and timely indicates roadway conditions. Vast amounts of data must be sent to devices to describe recent and current road conditions. This data needs to be understandable by the users and service providers; e.g. capable of being decoded and displayed accurately. Transmission of map content can be achieved through a variety of methods. For radio-based transmission, bandwidth is at a premium and as such, messages need to be concisely described.

SUMMARY

In one embodiment, a method for location referencing roadway data. A server determines a roadway event. The roadway event includes a roadway description and a roadway location. The server then generates a roadway message. The roadway message includes the roadway description and a roadway path. The roadway path includes a LinkID set, a length of the roadway event, and an offset from a reference node of a starting link. The LinkID set includes at least the starting link. The server then broadcasts the roadway message.

In one embodiment, an apparatus is configured to receive a broadcasted roadway message. The broadcasted roadway message includes a roadway description and a roadway path. The roadway path comprises a LinkID set, a length of the roadway event, and an offset from a reference node of a starting link. The apparatus is configured to decode a map location from the broadcasted roadway message using the map database and generate an image using the decoded map location and the roadway description.

In one embodiment, a method comprises a device receiving a broadcasted roadway message. The broadcasted roadway message includes a roadway description and a roadway path. The roadway path comprises a LinkID set, a length of the roadway event, and an offset from a reference node of a starting link. The device generates a map location from the broadcasted roadway message using the map database. The device generates an image using the decoded map location and the roadway description.

In one embodiment, an apparatus is configured to determine a roadway event. The roadway event includes a roadway description and a roadway location. The apparatus generates a roadway message. The roadway message includes the roadway description and a roadway path. The roadway path comprises a LinkID set, a length of the roadway event, and an offset from a reference node of a starting link. The apparatus broadcasts the roadway message.

BRIEF DESCRIPTION OF THE DRAWINGS

Exemplary embodiments of the present invention are described herein with reference to the following drawings.

DETAILED DESCRIPTION

A location reference (LR) is a unique identification of a geographic object. Location referencing techniques describe locations in the context of geographic databases that may be used to locate transport-related phenomena in an encoder system as well as in the decoder side. The following disclosure describes a method and format for encoding, transmitting and decoding references of locations pre-coded for maps. This method provides very accurate and at the same time extremely compact binary format to transmit such location references in systems with limited bandwidth capabilities. Once transmitted or broadcasted the location reference is decoded by a navigation device and used to display accurate information within a mapping context.

Figure 1:
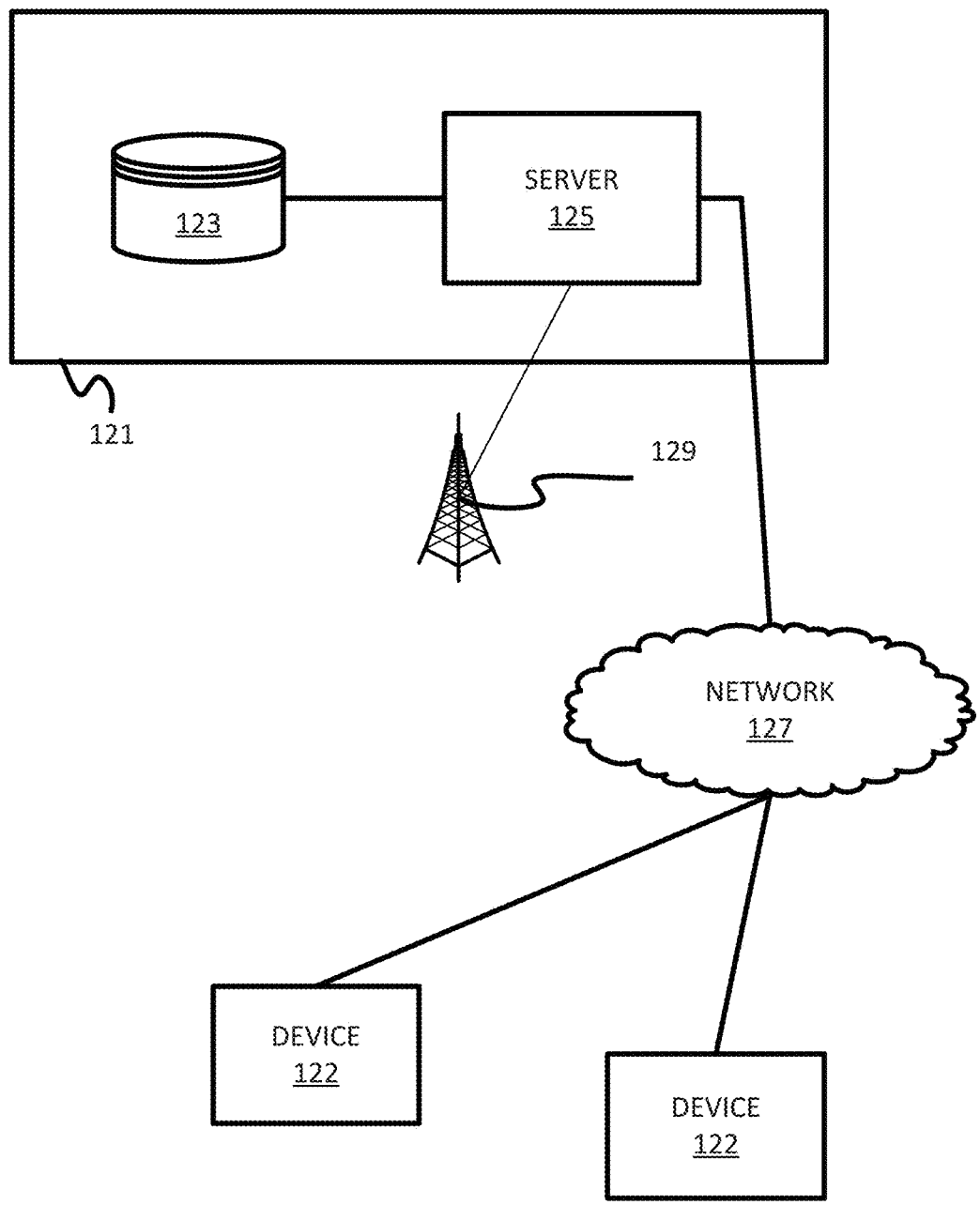
FIG. 1 illustrates an exemplary location referenced data transmission system.

FIG. 1 illustrates and exemplary location referenced data transmission system. The system comprises a navigation system 121 which includes a map database 123 and a server 125. The server 125 is connected to a network 127 which is connected to devices 122. The server 125 is also connected to a broadcast system 129.

The navigation system 121 includes a map database 123 and a server 125. A navigation system may be comprised of multiple servers, workstations, databases, and other machines connected together and maintained by a map developer. The navigation service may be configured to generate routes or paths between two points on a stored map. The navigation service may also be configured to provide up to date information and maps to external map databases or mapping applications. The navigation system may be configured to encode or decode map or geographic data.

The map database 123 (also referred to as a database or a geographic database) may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

In addition to the data describe above, the map database 123 may include node data records, road segment or link data records, Point of Interest (POI) data records, and other data records. More, fewer or different data records can be provided. In one embodiment, the other data records include cartographic data records, routing data, and maneuver data.

One or more portions, components, areas, layers, features, text, and/or symbols of the POI or event data may be stored in, linked to, and/or associated with one or more of these data records. For example, one or more portions of the POI, event data, or recorded route information may be matched with respective map or geographic records via position or Global Positioning System (GPS) data associations (such as using known or future map matching or geo-coding techniques).

The road segment data records are links or segments representing roads, streets, or paths, which can be used in the calculated roadway path, route or recorded route information for determination of one or more personalized routes. The node data records are points corresponding to the respective links or segments of the road segment data records. The road link data records and the node data records represent a road network, such as used by vehicles, cars, and/or other entities. Alternatively, for example, the map database 123 may contain path segment and node data records or other data that represent pedestrian paths or areas in addition to or instead of the vehicle road record data.

The road or link segments and nodes may be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The map database 123 may include data about the POIs and their respective locations in the POI data records. The map database 123 may also include data about places, such as cities, towns, or other communities, and other geographic features, such as bodies of water, mountain ranges, etc. Such place or feature data may be part of the POI data or may be associated with POIs or POI data records (such as a data point used for displaying or representing a position of a city). In addition, the map database 123 may include event data (e.g., traffic incidents, constructions, scheduled events, unscheduled events, etc.) associated with the POI data records or other records of the database 108.

Each road segment may be associated with two nodes (e.g., one node represents the point at one end of the road segment and the other node represents the point at the other end of the road segment). One node may be referred to as the non-reference node with the other node referred to as the reference node. The node at either end of a road segment may correspond to a location at which the road meets another road segment, an intersection, or where the road dead-ends. The road segment data record may also include data that indicate a classification, such as a rank of a road segment that may correspond to its functional class. Example functional classes include arterial roads, collector roads, and local roads. The prerecorded path may include roads outside of the functional classification system. Alternatively, an additional functional classification (e.g., private roads, temporary roads, or personalized roads) may be added to the geographic database to distinguish the prerecorded paths from other segments.

The database 123 may be maintained by a content provider (e.g., a map developer). By way of example, the map developer may collect geographic data to generate and enhance the geographic database 123. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example. Also, remote sensing, such as aerial or satellite photography, may be used. The database 123 is connected to the server 125.

Figure 2:
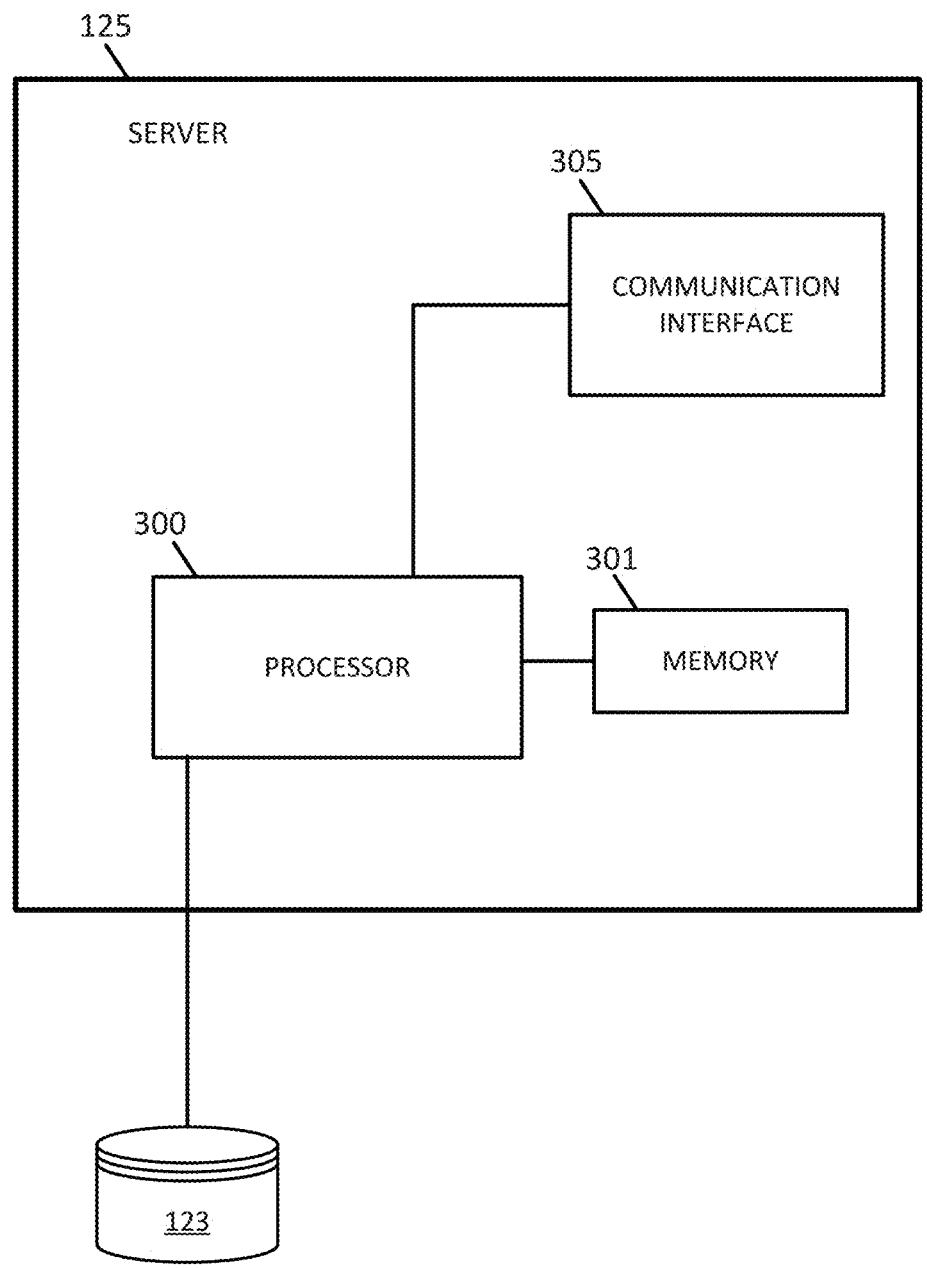
FIG. 2 illustrates an exemplary server of the location referenced data transmission system of FIG. 1.

FIG. 2 illustrates an exemplary server of the system of FIG. 1. The server includes a processor 300, which is connected to a communications interface 305 and a memory 301. The processor 300 is also connected to the database 123. Additional, different, or fewer components may be included.

The server 125 may be an encoder to encode data in alternative formats. An encoder may use a set of rules to translate data into a different format. The server 125 may be a host for a website or web service such as a mapping service and/or a navigation service. The mapping service may provide maps generated from the geographic data of the database 123, and the navigation service may generate routing or other directions from the geographic data of the database 123. The mapping service may also provide roadway information generated from roadway data included in the database 123. The server 125 may also provide recent or current roadway conditions using the recently or real time collected data. Historical and recent roadway data may also be blended to produce roadway descriptions.

The server 125 is connected to the network 127. The server 125 may receive roadway descriptions and roadway locations through the network 127. The network 127 may include wired networks, wireless networks, or combinations thereof. The wireless network may be a cellular telephone network, a wireless local area network, such as an 802.11, 802.16, 802.20, WiMax (Worldwide Interoperability for Microwave Access) network, or wireless short range network. Further, the network 127 may be a public network, such as the Internet, a private network, such as an intranet, or combinations thereof, and may utilize a variety of networking protocols now available or later developed including, but not limited to Transmission Control Protocol/Internet Protocol (TCP/IP) based networking protocols.

The server 125 may also be connected to a broadcast system 129. The broadcast system 129 uses over the air technologies as RDS (Radio Data System), DAB (Digital Audio Broadcasting), HD Radio, etc. RDS (Radio Broadcast Data System is the official name used for the United States version of RDS), for example, is a communications protocol standard for embedding small amounts of digital information in conventional frequency modulation (FM) radio broadcasts. HD radio, which is used in the United States, may have limited bandwidth system. The server 125 uses the broadcast system 129 to broadcast roadway messages. If the roadway message is broadcasted, a navigation device 122 may contain a radio receiver to receive the message. A roadway message may be broadcasted or transmitted to multiple devices 122. The devices 122 are connected to the network or may receive data transmitted from the broadcast system 129.

Figure 3:
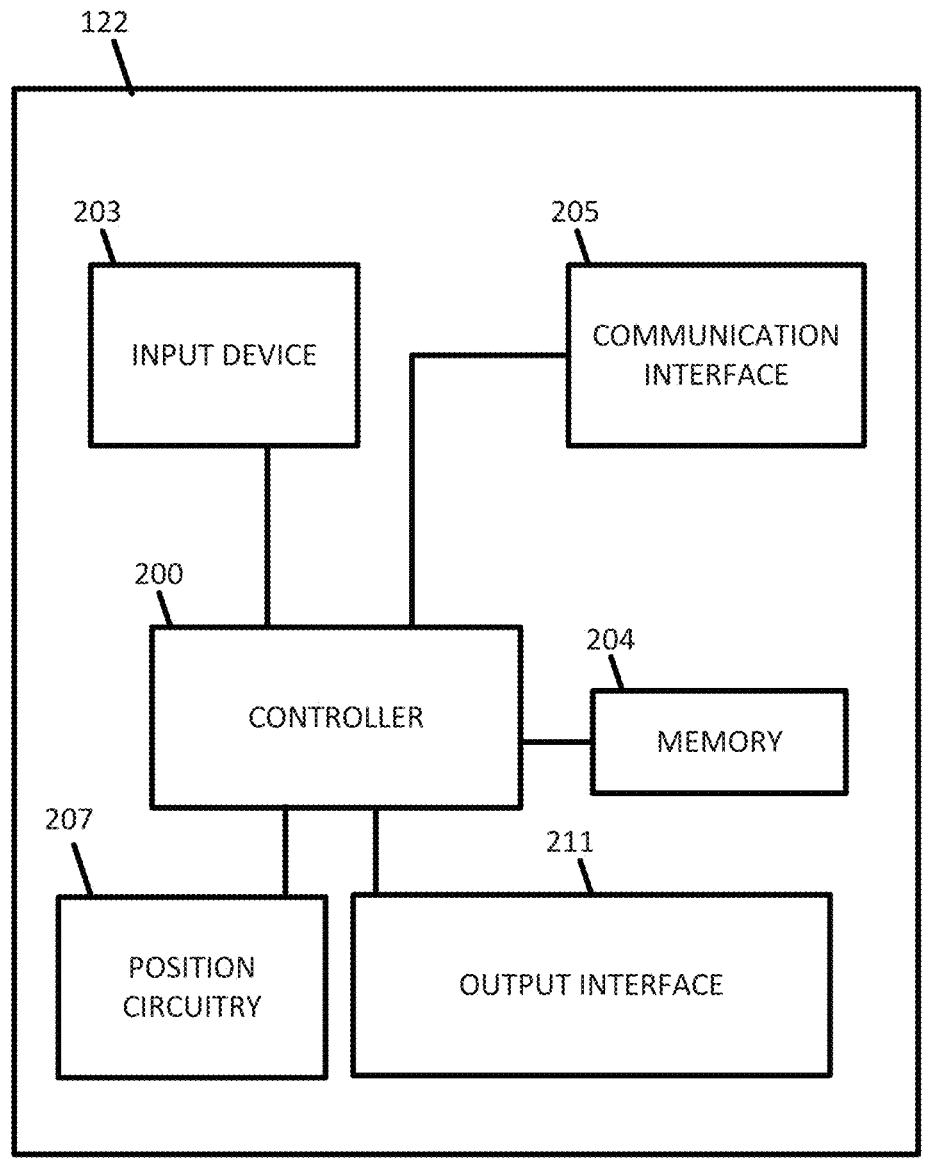
FIG. 3 illustrates an exemplary mobile device of the location referenced data transmission system of FIG. 1.

FIG. 3 illustrates an exemplary device 122. The device 122 may be configured to receive, process, and display data to a user. The device 122 may also be referred to as a mobile device 122 or a navigation device 122. The navigation device 122 includes a controller 200, a memory 204, an input device 203, a communication interface 205, position circuitry 207, movement circuitry 208, and an output interface 211. The output interface 211 may present visual or non-visual information such as audio information. Additional, different, or fewer components are possible for the mobile device 122. The navigation device 122 may be smart phone, a mobile phone, a personal digital assistant (PDA), a tablet computer, a notebook computer, a personal navigation device (PND), a portable navigation device, and/or any other known or later developed mobile device. In an embodiment, a vehicle may be considered a mobile device, or the mobile device may be integrated into a vehicle.

Figure 4:
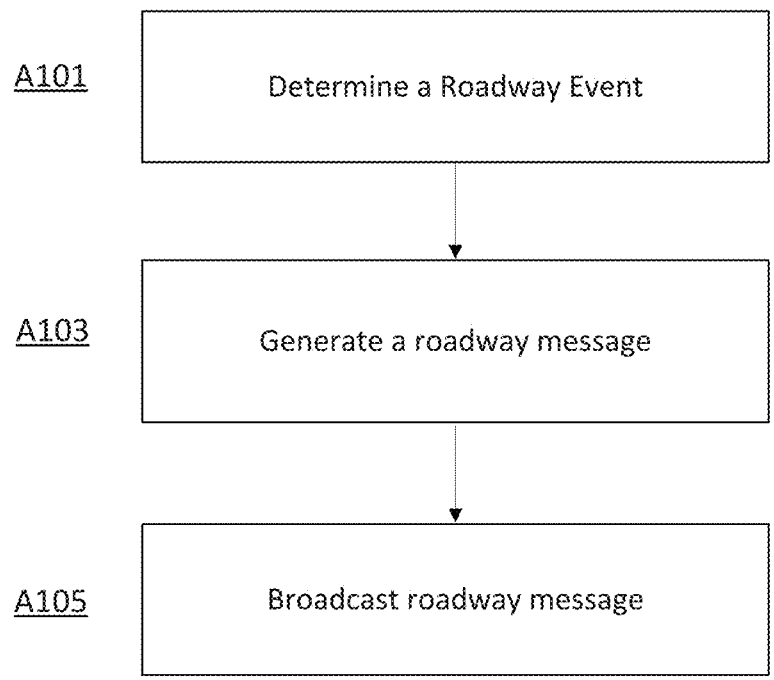
FIG. 4 illustrates an exemplary flowchart for location referencing for roadway feature data.

FIG. 4 illustrates an example method of transmitting location referenced data. FIG. 4 includes acts A101-A107. As presented in the following sections, the acts may be performed using any combination of the components indicated in FIG. 1, FIG. 2, or FIG. 3. The following acts may be performed by the server 125, the device 122, or a combination thereof. Additional, different, or fewer acts may be provided. The acts are performed in the order shown or other orders. The acts may also be repeated.

Figure 5:
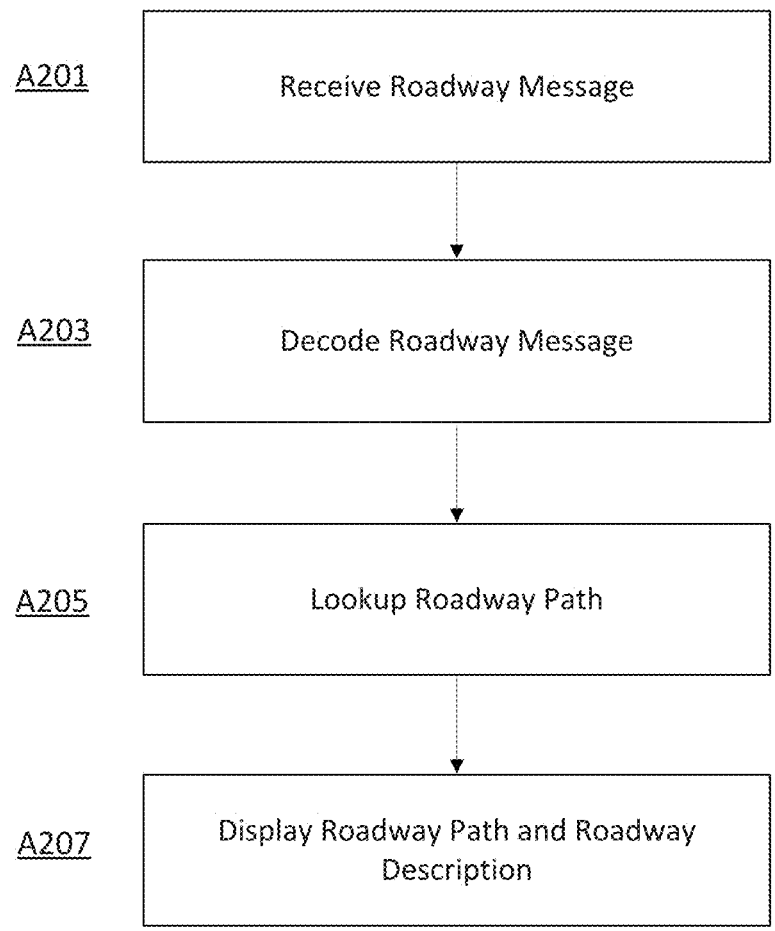
FIG. 5 illustrates an exemplary flowchart for location referencing for roadway feature data.

FIG. 5 illustrates an example method for receiving location referenced data. FIG. 5 includes acts A201-A205. As presented in the following sections, the acts may be performed using any combination of the components indicated in FIG. 1, FIG. 2, or FIG. 3. The following acts may be performed by mobile device 122, server 125, or a combination thereof. Additional, different, or fewer acts may be provided. The acts are performed in the order shown or other orders. The acts may also be repeated.

At act A101, the processor 300 determines a roadway event; including a roadway description and a roadway location. Roadway events may be determined from a variety of sources. Field personal may report roadway conditions, which may be collected automatically or manually. Probe vehicles may transmit data regarding road segments or locations back to a central clearinghouse. Remote sensing, such as aerial or satellite photography may be used to collect information. Roadway events may be collected from social networks or from other internet based sources. A device may also be used as one or more probes or sensor(s) to collect roadway data. Roadway data may be collected with a roadway location (from GPS, navigational device, mobile devices, or other devices that may collect positional data) and a roadway description.

Roadway descriptions may encode a wide range of road information, from accidents, obstructions to congestion and delays. Roadway descriptions may also deal with public transport from rail, bus to air traffic and ferry services. Other roadway events or features might include: construction, accidents, roadway closures, roadway congestion, roadway speeds roadway pricing, roadway surface condition, roadway environmental condition, roadway risk index (for use in insurance applications), roadway traversal energy requirements (for use in green routing applications), or other 'non-normal' roadway conditions. These features may reference current conditions and predictive conditions. Previous conditions are not as likely to be transmitted or broadcasted.

A roadway location may be derived from GPS coordinates, link or road segments, or other positional data. The roadway location may be indicated on a map, which may be translated by the map database 123. The roadway location may be descriptive (such as on street Z, from the intersection of street A to the intersection of street B). The roadway location may be described in terms of landmarks or other attributes stored in the map database 123.

At act A103, the processor 300 generates a roadway message. The roadway message includes the roadway description and a roadway path. The roadway path comprises a type, one or more link IDs (LinkID or LinkID set), a length of the roadway event (Length), and an offset from a reference node of a starting link (Offset). The roadway path, once described, may be packaged to a message as Extensible Markup Language (XML), JavaScript Object Notation (JSON), text, or binary data. Other formats may be used to encode the roadway path. An XML format may be used if the need of having a compact format is less important and if the existing environment for data transmission is already based on XML.

A roadway path scheme may be divided into three types: a first type referred to as Link, as second type referred to as LinkOffset, and a third type referred to as Linear. Each roadway path may only contain one type. Each type represents a different type of location reference and may require a different set of information to describe. Each roadway may represent one direction of travel, e.g. one side of a roadway. To describe both sides (e.g. northbound and southbound), the processor 300 may need to use two separate messages with two separate roadway paths.

FIGS. 6A, 6B, 6C, 7 and 8 illustrate how the roadway path is encoded. In each figure, a roadway path is shown with multiple links and nodes. Each link is marked with the distance that it takes to go from one node to another. The thicker lined arrow in each figure represents the desired roadway path that is to be encoded.

The type referred to as Link is designed to represent a simple location reference, usually a small stretch of a road comprising of one or a few links without any intersections. The roadway path includes only two attributes: a LinkID set containing a single link representing a starting location (node) on a map and a length attribute. The length attribute is represented by signed integer data type—positive numbers may mean direction from a reference node to a non-reference node, and negative numbers may mean direction from a non-reference node to a reference node.

Figure 6A:
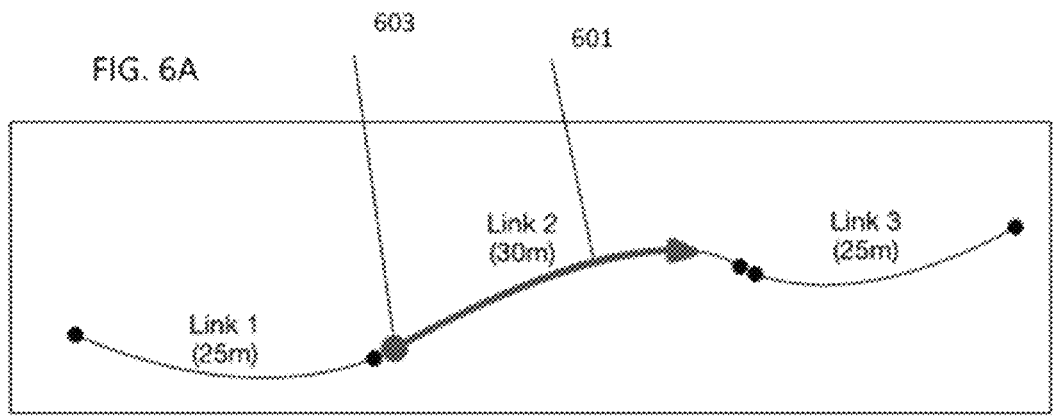
FIGS. 6A, 6B, and 6C illustrate examples of roadway paths.

FIG. 6A illustrates a link location reference with a type of Link. The processor 300 determines a roadway condition exists along the thicker path with an arrow. The processor 300 finds Link 2 in the map database 123 and creates a roadway path 601 from the starting link reference node 603 for the length specified in the message as shown in FIG. 6A. The roadway path 601 may be encoded as (Link; Link 2; 25). The type is Link, which only requires two additional attributes, the LinkID and the length.

Figure 6B:
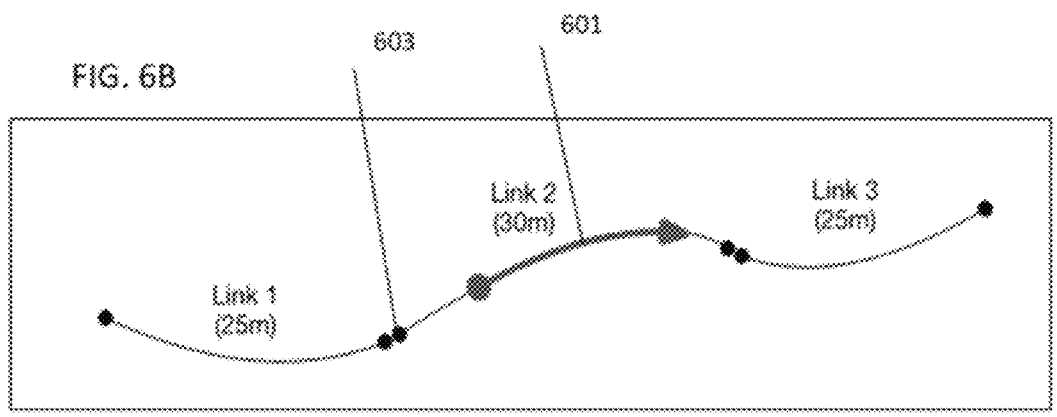
Figure 6C:
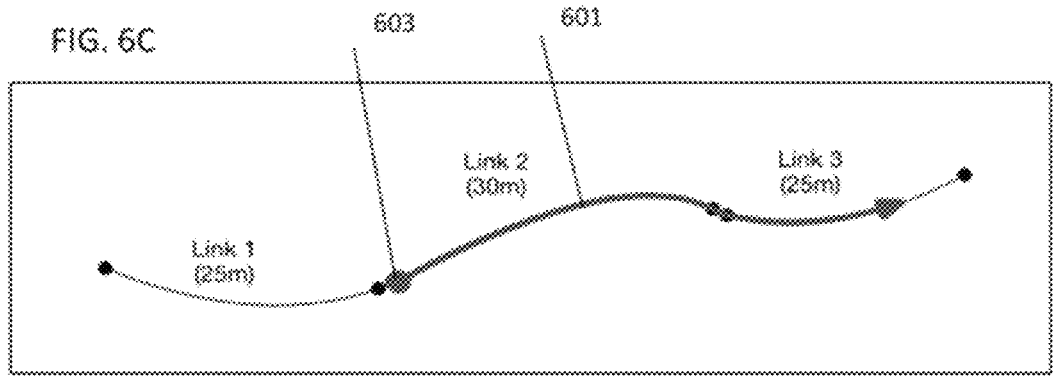

Longer pathways might require that the roadway path 601 extend for multiple map links, as shown in FIG. 6C. In FIG. 6C, there is illustrated an example of a longer Link Location Reference. As there are no connecting roadways or decision points for the length of the construction, the roadway path 601 beings at the starting link reference node 603 and simply extends beyond the extent of the starting link and into the adjacent link (or links, as needed). The roadway path 601 may be encoded as (Link, Link 2, 45). The type is Link, which only requires two additional attributes, starting link and length.

The LinkOffset type is designed to represent a simple location reference, usually a small stretch of a road comprising of one or a few links without any intersections. The roadway path includes a field LinkID representing a starting link on a map, plus the length and offset attributes. The length and offset elements are both represented by signed integer data type—positive numbers may mean direction from a reference node to a non-reference node, and negative numbers may mean direction from a non-reference node to a reference node.

FIG. 6B illustrates a link location reference with a type of LinkOffset. If the roadway feature does not start at the reference-node of the starting link, an additional piece of information is required: Distance from the Starting link reference-node. This is described as a LinkOffset Location Reference type. The processor 300 creates the roadway path 601 at the specified distance from the starting link reference node 603, as shown in FIG. 6B. The roadway path 601 may be encoded as (Linkoffset; Link 2; 15; 10). The type is Linkoffset which requires three attributes, the LinkID, the length, and the offset.

The Linear type is designed to represent longer and more complex locations, usually large stretch of a road with intersections, forks and other splits. The information provided in the location reference by the encoder needs to be sufficient for a receiving navigation device 122 decoder to reconstruct the original road configuration correctly. The information provided also needs to be compact and efficient in order to limit bandwidth.

A Linear type may include a variable sized LinkID set with at least one element or ink identifying the starting link. The LinkID set may also include a list of link identifications used in the map database 123 to describe road segments or links. The first link in the LinkID may be the starting link. The additional link elements may be provided as guidance to clarify the correct path for the decoder when a road forks or has a complex interchange.

The Linear type also includes a length and offset variable. The length attribute represents a total distance of the starting location from a beginning of the first link (minus offset if present) in the list. The optional offset attribute indicates distance from the beginning of first link in the list to the starting location. The length and offset attributes are both represented by signed integer data type—positive numbers may mean direction from a reference node to a non-reference node, and negative numbers may mean direction from a non-reference node to a reference node.

For roadway events embodying more complex roadway geometry, the processor 300 may supply an extra piece of information to encode the roadway path. The concept requires use of Link ID Set information to guide the encoding of the roadway path. A LinkID set may include a starting link and one or more additional link elements. In order to conserve bandwidth and increase efficiency, the LinkID set may not contain every that link that is described by the roadway path. One or more rules may represent the criteria that for when the processor includes links in the LinkID set. These rules may be the same for encoding and decoding the roadway path; the same rules are used by the encoder and decoder.

An example of a rule is to only include links that are subsequent to a turn. The LinkID set contains a starting link, but then following this rule, would include each link that occurs directly after a change in direction (or a turn). A turn may be a transfer from one link of a named street or roadway to a second link, which is part of a differently named street, or roadway. Examples of a turn would be taking a Left on Maple Street off of Main Street; Exiting a freeway to the service road; Veering right off of Pine Street to Pine Avenue; etc. Rules may also exist to include links where the type of road changes, e.g. from highway to off-ramp. The map database 123 includes multiple attributes, such as street names, address ranges, speed limits, turn restrictions at intersections, and other navigation related attributes, as well as POIs. A rule may state that a link is to be included if there is a change in status (speed limit; road type; roadway feature; etc.). A rule may take into effect other attributes of a link; for example a link after a turn may not need to be included if the only other option was turning onto a one way street going the wrong direction.

Another example of a rule may be to only include links when there is a change of direction of greater than a predefined threshold. For example, the threshold may be an angle of 60 degrees. If this is the rule, a link would only be included if it was at an angle of greater than 60 degrees from a previous link. The predefined threshold may be set to include 90 degree intersections or to include slight veers such as exiting or entering an on ramp. A low threshold would mean that any slight change in direction or bearing would add the link to the LinkID set. A high threshold would allow for a smaller LinkID set, but might result in an error.

The angle threshold may be configurable. A map developer may enter the angle threshold based on an error threshold that is acceptable. The predefined threshold may vary based on the type of road, region, or jurisdiction that is being traveled. For example, the angle threshold for the change of direction may be based on functional classification of the roadway. Arterial roads may be assigned one angle threshold, collector roads assigned another threshold, and local roads assigned a third angle threshold. In one embodiment, intersections where the turn options are onto segments with lower functional classifications may be treated differently than turns onto similar type roads. Different roadway descriptions may also use different rules. For example, a construction event may have a large predefined angle threshold as construction events rarely veer off of a road. Rules may also be country or jurisdiction specific. Different regions may have different types of roads or classify intersections differently. Rules may also consider the habits of drivers or vehicles. Rules may be limited to specific roadway types such as roundabouts or freeways; e.g. a rule may ignore the multiple segments that make up a roundabout. A rule may indicate that a link only need be included when there is a change in roadway type; for example exiting a freeway or when a freeway intersects with another freeway.

Rules for when to include a link may be combined. Multiple rules may be provided to encode and decode a roadway path. The rule set that is used to encode the path may be known to the device that decodes the path. One or more different rule sets may be stored and identified on the server (encoder) and the device (decoder). A rule set (or alias, or identification) which is used to decode the pathway may be transmitted along with the encoded data. The decoder may receive the alias or rule set identification and then use that specific rule set to decode the data. Version numbers and other data that identify the rule set may also be included with the decoded data. The rules of a rule set may be updated as necessary when updating a device or over the network.

Figure 7:
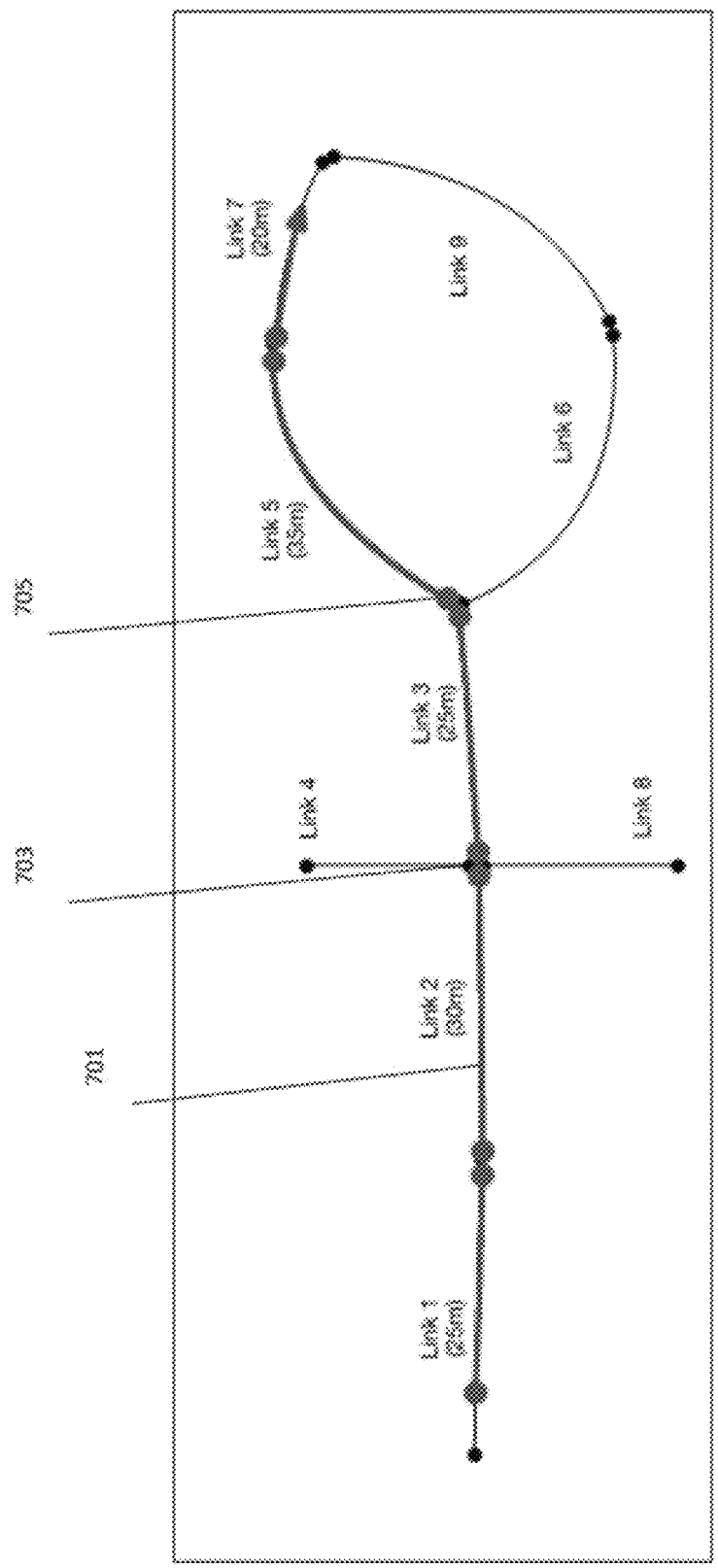
FIG. 7 illustrates an example of a roadway path
Figure 8:
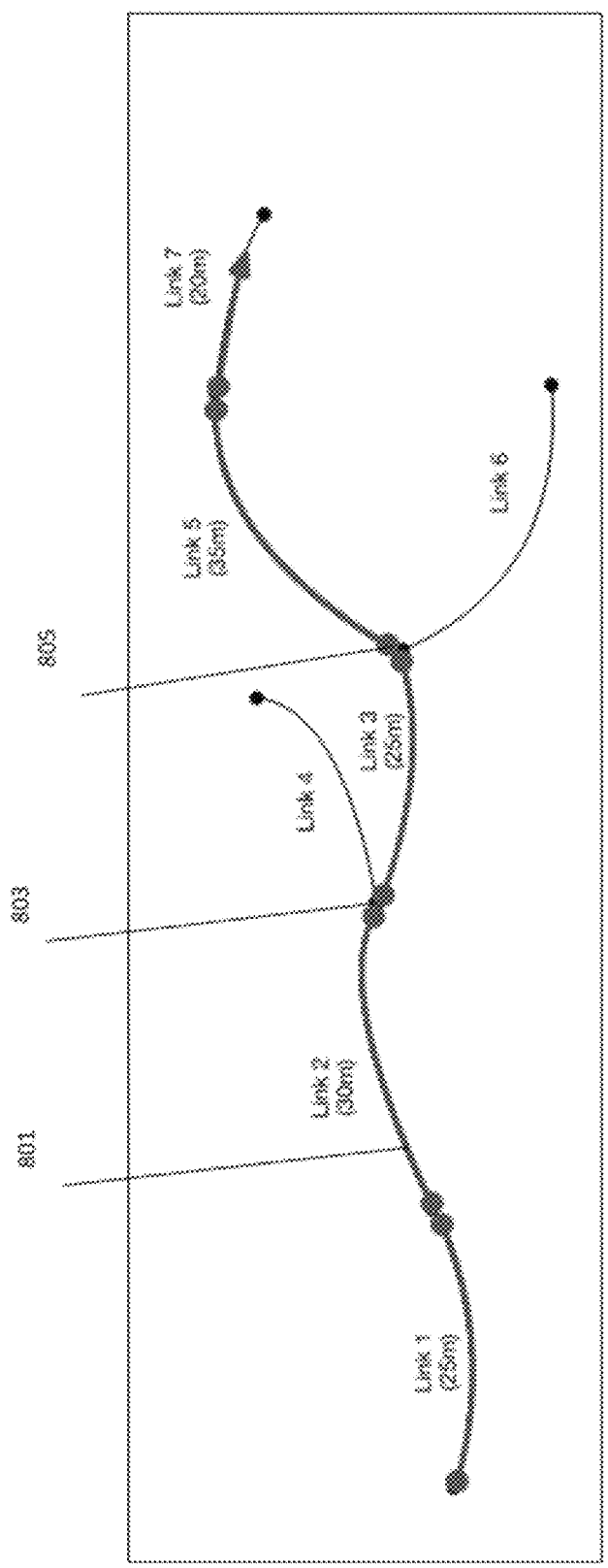
FIG. 8 illustrates an example of a roadway path

FIGS. 7 and 8 illustrate link location references with a type of Linear. For FIG. 7, starting at link 1 and extending the roadway path 701 past the intersection 703 of Link 4 and Link 8, may only involve including one additional link (Link 5). Since the path does not turn onto Link 4 or Link 8, there may not be a need to include Link 3 in the LinkID set. Additionally, since the bearing direction between Link 2 and Link 4 (or Link 8) is perpendicular, it may not be interpreted by a client application as a logical path without specific instructions. Additionally, Links 2 and 3 may be the same named street or road. If, however, the path was to turn onto Link 4, the link set may contain this information and 'guide' the roadway path 701 accordingly. A more problematic situation arises at the junction 705 of Link 3 with Link 5 and Link 6. The processor 300 may include Link 5 in the Link ID Set to guide the roadway path accordingly as it turns onto Link 5. The intersection of Link 3, Link 5, and Link 6 may be considered the path taking a "turn" as the previous street (Link 1, Link 2, Link 3) appears to end at the intersection creating a fork in the road. The roadway path 701 may be encoded as (Linear; Link 1, Link 5; 120; 10). The type is linear, which requires the LinkID set (with a starting link), the length, and an offset if there is one.

FIG. 8 illustrates a similar situation, however, the intersection between Link 2, 3, and 4 is not as clear. Depending on the rule set, Link 3 may be included in the Link ID set. For example, if Link 2 and Link 4 had the same street name, then the path would appear to turn off onto Link 3. In such a case (depending on the rule set), to guide the roadway path 801 correctly, the processor 300 may include Link 3 in the Link ID Set. Using a different rule set, the bearing direction at the intersection 803 between Link 2 and Link 4 is smaller than the example in FIG. 7, (less than 60 degrees, for example, in the direction of travel) so it might be considered as a likely roadway path. The processor 300 may include Link 5 for the same reasons as described in FIG. 7: the junction 805 between Link 3, Link 5, and Link 6 needs clarification. The roadway path 801 may be encoded as (Linear; Link 1, Link 3, Link 5; 130). The type is linear, which requires the LinkID set (with a starting link) and the length but no offset as there is none.

As mentioned above, the roadway path may be encoded within binary. The following tables illustrate the formatting and components for representing a location reference.

TABLE 1

LocationReference

| | |
|---|---|
| <LocationReference(254)>:= | |
| <IntUnTi>(254), | : id of this component |
| <IntUnLoMB>(lengthComp), | : number of bytes in component |
| <IntUnLoMB>(lengthAttr), | : number of bytes in attributes |
| <MajorMinorVersion>(version), | : Version numbering is used to track the separate versions of an application through its development and deployment. The differences between these versions may have an impact on client devices. It is represented by a standard TPEG type <i>MajorMinorVersion,</i> having two part numeric value [MajorVersion.MinorVersion] with MajorVersion and MinorVersion, each having a range of [0 . . . 15]. |
| ordered { | |
|    <LRType>(hlrType) | |
| }; | |

TABLE 2

LR TYPE

| | |
|---|---|
| <LRType(x)>:= | |
| <IntUnTi>(x), | : id of this component |
| <IntUnLoMB>(lengthComp), | : number of bytes in component |
| <IntUnLoMB>(lengthAttr); | : number of bytes in attributes |

TABLE 3

LINK

| | |
|---|---|
| <Link(1)<LRType(1)>>:= | |
| <IntUnTi>(1), | : Identifier of this component |
| <IntUnLoMB>(lengthComp), | : number of bytes in component, excluding the id and length indicator |
| <IntUnLoMB>(lengthAttr), | : number of bytes in attributes |
| <IntUnLo>(linkId), | : link ID |
| <IntSiLoMB>(length), | : This element indicates the total length of this location (in meters) |

TABLE 4

LinkOffset

| | |
|---|---|
| <Link(1)<LRType(2)>>:= | |
| <IntUnTi>(2), | : Identifier of this component |
| <IntUnLoMB>(lengthComp), | : number of bytes in component, excluding the id and length indicator |
| <IntUnLoMB>(lengthAttr), | : number of bytes in attributes |
| <IntUnLo>(linkId), | : link ID |
| <IntSiLoMB>(length), | : This element indicates the total length of this location (in meters) |
| BitArray(selector), | |
| if (bit 0 of selector is set) | |

TABLE 4-continued

LinkOffset

| | |
|---|---|
| <IntSiLoMB>(offset), | : This is the optional element, if present it indicates the distance from the beginning of the Link to the start of this location (in meters). |

TABLE 4

LINEAR

| | |
|---|---|
| <Linear(2)<LRType(3)>>:= | |
| <IntUnTi>(3), | : Identifier of this component |
| <IntUnLoMB>(lengthComp), | : number of bytes in component, excluding the id and length indicator |
| <IntUnLoMB>(lengthAttr), | : number of bytes in attributes |
| <IntUnLoMB>(n), | |
| n * <IntUnLo>(linkId), | : A list of Link Ids. The first link is the first element. Additional elements will be provided as guidance to clarify the correct path for the decoder when a road forks or has a |

TABLE 4-continued

LINEAR

| | |
|---|---|
| | complex interchange. The additional element will typically be the first link past the fork or interchange in the direction of the line |
| <IntSiLoMB>(length), | : This element indicates the total length of this location (in meters) |
| BitArray(selector), if (bit 0 of selector is set) | |
| <IntSiLoMB>(offset), | : This element; if present it indicates the distance from the beginning of the first element in the linkIdSet to the start of this location (in meters). |

At act A105, the processor 300 broadcasts the roadway message. As mentioned above, the roadway path may be encoded in binary, XML or another format. The roadway path and roadway description may be bundled or packaged together and then transmitted through the network or over the air (e.g. Radio Data system, Digital Radio Broadcast system, High Definition FM radio broadcast system). The transmitted message may be received by a navigation device 122 either directly (through a targeted request or transmission) or indirectly (broadcasted out to be available for every device that may decode the message).

FIG. 5 illustrates an example method for receiving location referenced data. As mentioned a roadway message may be broadcasted or transmitted by a navigation service or server. Messages may also be sent or broadcasted by other devices either through the network or through an alternative messaging system. As presented in the following sections, the acts may be performed using any combination of the components indicated in FIG. 1, FIG. 2, or FIG. 3. The following acts may be performed by mobile device 122, server 125, or a combination thereof. Additional, different, or fewer acts may be provided. The acts are performed in the order shown or other orders. The acts may also be repeated.

At act A201, a navigation device 122 receives a roadway message containing a roadway description and a roadway location. The navigation device 122 may be a smart phone, a mobile phone, a personal digital assistant (PDA), a tablet computer, a notebook computer, a personal navigation device (PND), a portable navigation device, and/or any other known or later developed mobile device. In an embodiment, a vehicle may be considered a mobile device, or the mobile device may be integrated into a vehicle. The roadway message may be received through the communication interface and stored in memory. The roadway message may be a broadcasted message or sent directly to the navigation device 122.

The memory 204 and/or memory 801 may be a volatile memory or a non-volatile memory. The memory 204 and/or memory 801 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card. The memory may contain a locally stored map database. The locally stored map database may be a copy of the map database or may comprise a smaller piece. The locally stored map database may use the same formatting and scheme as the map database.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format. The communication interface 205 and/or communication interface 305 may include a receiver/transmitter for digital radio signals or other broadcast mediums. A receiver/transmitter may be externally located from the device 122 such as in or on a vehicle.

At act A203, the navigation device 122 using a controller or a processor decodes the roadway message. A roadway message may be formatted in XML, binary, JSON, or other message format. Decoding the roadway message includes determining the path or locations represented by the roadway location. In tables 1-4 above, the binary description of roadway messages is explained. Using these rules and a locally stored map database, the controller is able to translate the roadway location into a description of the path. For example, the roadway path may contain a type, a LinkID set, a length, and an offset. The type may indicate which type of path and therefore which additional data is expected in the message. There may be three types specified (Link, LinkOffset, or Linear). The roadway message may also be formatting using the following XML components:

```
HLRType
<xs:complexType name="HLRType">
 <xs:sequence>
  <xs:choice minOccurs="1" maxOccurs="1">
   <xs:element name="optionLink" type="Link" minOccurs="1" maxOccurs="1"/>
   <xs:element name="optionLinkWithOffset" type="Linear" minOccurs="1" maxOccurs="1"/>
   <xs:element name="optionLinear" type="Linear" minOccurs="1" maxOccurs="1"/>
  </xs:choice>
 </xs:sequence>
</xs:complexType>
Link
<xs:complexType name="Link">
 <xs:sequence>
```

```
 <xs:element name="linkId" type="tdt:IntUnLo" minOccurs="1" maxOccurs="1"/>
 <xs:element name="length" type="tdt:IntSiLoMB" minOccurs="1" maxOccurs="1"/>
</xs:sequence>
</xs:complexType>
LinkWithOffset
<xs:complexType name="LinkWithOffset">
<xs:sequence>
 <xs:element name="linkId" type="tdt:IntUnLo" minOccurs="1" maxOccurs="1"/>
 <xs:element name="length" type="tdt:IntSiLoMB" minOccurs="1" maxOccurs="1"/>
 <xs:element name="offset" type="tdt:IntSiLoMB" minOccurs="0" maxOccurs="1"/>
</xs:sequence>
</xs:complexType>
Linear
<xs:complexType name="Linear">
<xs:sequence>
 <xs:element name="linkIdSet" type="tdt:IntUnLo" minOccurs="1" maxOccurs="unbounded"/>
<xs:element name="length" type="tdt:IntSiLoMB" minOccurs="1" maxOccurs="1"/>
 <xs:element name="offset" type="tdt:IntSiLoMB" minOccurs="0" maxOccurs="1"/>
</xs:sequence>
</xs:complexType>
```

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing. The controller 200 may also include a decoder used to decode roadway messages and roadway locations.

At act A205, the navigation device 122 looks up the decoded roadway path in the roadway message using a locally stored map database that may reside in memory. The locally stored map database may contain road segment data records, links, or segments representing roads, streets, or paths. The locally stored map database may also contain nodes. The node data records are points corresponding to the respective links or segments of the road segment data records. The road link data records and the node data records represent a road network, such as used by vehicles, cars, and/or other entities. In act A203, the roadway path was decoded into potentially four pieces of data: Type, LinkID set, Length, and Offset. The links that are in the LinkID set may match up with the links in the locally stored map database. The link data records may also contain a reference node and a non-reference node. The Offset data represents any offset from a reference node in a link. The length data represents the total length of the road pathway.

Unlike the Link or LinkOffset types, a Linear type may include a variable sized LinkID set with at least one element/link identifying the starting link. The LinkID set may also include a list of Link Ids (or PVID) used in the map database to describe road segments or links. The first link in the LinkID may be the starting link. Additional link elements are provided as guidance to allow the navigation device 122 to decode the pathway; for instance when a road forks or has a complex interchange. The additional elements may typically be the first link past the fork or interchange in the direction of the linear. In order to increase efficiency and save bandwidth, the LinkID may not contain every link that is described by the roadway path. Which links are included is a result of a rule set used by the decoder (the same rule set that was used to encode the roadway path). This is described above and illustrated in FIGS. 7 and 8. Typically only a link after a turn or fork is needed to decode the correct path. Further, using another rule, if the intersection is at a large angle (e.g. the road or link that is intersecting the roadway path is directed towards a different direction) or if the intersecting link has no possible connection to other links in the LinkId, the processor may not include it in within the LinkID.

After being decoded, the LinkID set, the length, and the offset allow the navigation device 122 to generate a path or route that represents where the roadway description is occurring. Using the link and node data in the locally stored map database, the navigation device 122 may be able to associate the path with additional data.

At act A207, the navigation device 122 displays an image representing the roadway event. Depending on the information included and what purpose the navigation device 122 is serving, the image may take multiple forms. If, for example, the navigation device 122 is currently displaying a map, the image may augment or overlay the existing display. A roadway path may be highlighted or an icon may be added that indicates the roadway description received. The device may also include an audio or visual alert with the image that represents the roadway description received. For example, a flashing icon and/or an alarm may go off if the navigation device 122 is about to enter a road segment, which is described by the roadway message. The icon or representation of the roadway event may be selected using the input device to acquire further information that was sent in the road message.

The input device 203 may be one or more buttons, keypad, keyboard, mouse, stylus pen, trackball, rocker switch, touch pad, voice recognition circuit, or other device or component for inputting data to the mobile device 122. The input device 203 and the output interface 211 may be combined as a touch screen, which may be capacitive or resistive. The output interface 211 may be a liquid crystal display (LCD) panel, light emitting diode (LED) screen, thin film transistor screen, or another type of display. The output interface 211 may also include audio capabilities, or speakers.

Figure 9:
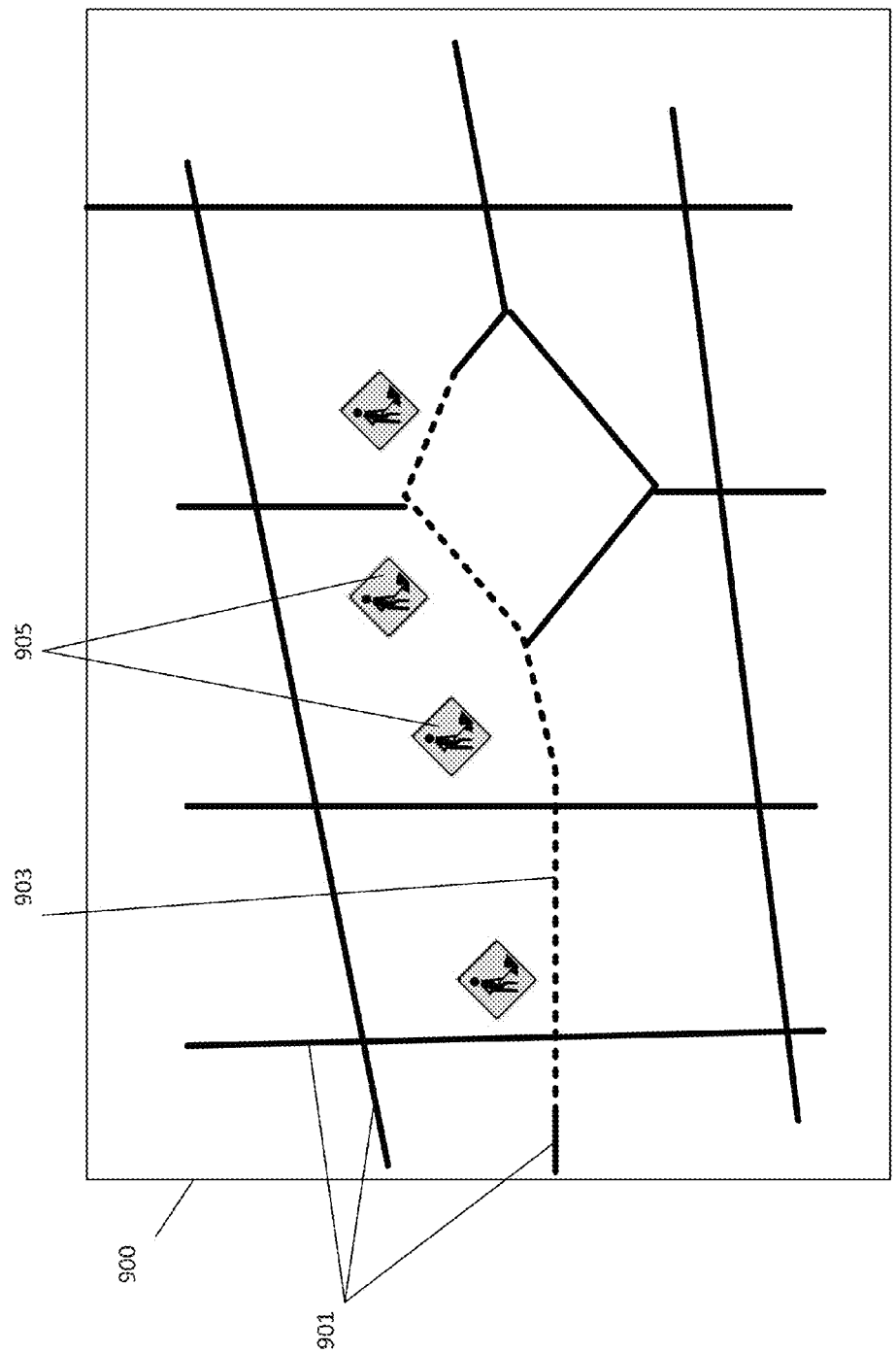
FIG. 9 illustrates an example of a graphical representation of a roadway event.

FIG. 9 illustrates a graphical representation of a roadway event. The roadway network 900 or map 900 depicts a series of roads 901. The roadway event is indicated by the dashed line 901 and the construction icons 903.

The navigation device 122 may also update the locally stored map database with the information included within the roadway message. This includes updates to time to travel costs among other data attributes that are associated with road segments. Depending on the geographic position of the navigation device 122, the map may include the location of the device and any roadway descriptions that are nearby.

The positioning circuitry 207, which is an example of a positioning system, is configured to determine a geographic position of the mobile device 122. The movement circuitry 208, which is an example a movement tracking system, is configured to determine movement of a mobile device 122. The position circuitry 207 and the movement circuitry 208 may be separate systems, or segments of the same positioning or movement circuitry system. In an embodiment, components as described herein with respect to the mobile device 122 may be implemented as a static device. For example, such a device may not include movement circuitry 208, but may involve a traffic or speed detecting input device 203.

The mobile device 122 may also be configured to execute routing algorithms to determine an optimum route to travel along a road network from an origin location to a destination location in a geographic region. Using input(s) including traffic speed data from the server 125, a mobile device 122 examines potential routes between the origin location and the destination location to determine the optimum route. The navigation device 122 may then provide the end user with information about the optimum route in the form of guidance that identifies the maneuvers required to be taken by the end user to travel from the origin to the destination location. Some mobile device 122 show detailed maps on displays outlining the route, the types of maneuvers to be taken at various locations along the route, locations of certain types of features, and so on.

The information included within the roadway message (roadway description and roadway location) may be used to create or alter an existing route. For example, the navigation device 122 may calculate a route from a starting point to a destination involving several road segments. If prior to or during travel along the route, a navigation device 122 receives a roadway message indicating that an accident, construction, road closure, or other event has occurred, the navigation device 122 may generate an alternative route taking into consideration the roadway description and the road segments that are described by the roadway location. Roadway messages are useful in that a roadway message may be broadcast cheaply (bandwidth) and include extensive information that is useful for routing decisions. Industries and services that use navigations service require up to date information to make intelligent routing decisions. Services such as delivery services or emergency services may prefer that accidents, congestion, construction, or other roadway descriptions are known immediately when they occur (and also when they clear) in order to perform their function efficiently.

The information included in the roadway message may also be used to directly or indirectly navigation a vehicle. The navigation device 122 may be integrated into an autonomous vehicle or a highly assisted driving (HAD) vehicle. The navigation device 122 may be configured as a navigation system for an autonomous vehicle or a HAD. An autonomous vehicle or HAD may take route instruction based on the traffic speed data provided to the navigation device 122.

As described herein, an autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes.

As described herein, a highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible.

The autonomous or highly automated driving vehicle may include sensors for identifying the surrounding and location of the car. The sensors may include GPS, light detection and ranging (LIDAR), radar, and cameras for computer vision. Proximity sensors may aid in parking the vehicle. The proximity sensors may detect the curb or adjacent vehicles. The autonomous or highly automated driving vehicle may optically track and follow lane markings or guide markings on the road.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
    identifying an event that relates to a sequence of contiguous links in a roadway network, the event including a description of the event;
    identifying a subset of links of the sequence of contiguous links including a fewer number of links than a number of the contiguous links; wherein the subset of links only includes links in the sequence of contiguous links that are immediately subsequent to a change of direction in the sequence of contiguous links;
    encoding a roadway message, the roadway message including the description and a location reference; wherein the location reference comprises:
    an identifier for a starting link,
    an identifier for each of a subset of links of the sequence of contiguous links,
    a length of the event, and
    an offset distance from a reference node of the starting link of the event, and
    broadcasting the roadway message to a navigation device.

2. The method of claim 1, further comprising:
    encoding the roadway message in extensible markup language.

3. The method of claim 1, further comprising:
    encoding the roadway message in binary.

4. The method of claim 1, wherein the roadway message is broadcast over digital radio.

5. The method of claim 1, wherein a direction of travel is in a direction towards the reference node when the length of the event is positive and away from the reference node when the length of the event is negative.

6. The method of claim 1, wherein the subset of links further does not include links that are not immediately subsequent to an intersection of three or more links.

7. The method of claim 1, wherein the subset of links further includes links that are immediately subsequent to a turn onto a different street.

8. The method of claim 1, wherein the location reference further includes a link type; wherein if the link type is a first type the offset is zero and the subset of links only includes the starting link; if the link type is a second type the offset is non-zero and the subset of links only includes the starting link; and if the link type is a third type, the subset of links includes two or more links, wherein one of the two or more links is the starting link.

9. An apparatus comprising:
    at least one processor; and
    at least one memory including computer program code for one or more programs; the at least one memory configured to store the computer program code configured to, with the at least one processor, cause the apparatus to at least perform:
    receive a broadcasted roadway message, wherein the broadcasted roadway message includes a roadway description and a location reference of a roadway event, the location reference comprising a starting link, a subset of links of a set of links on which the roadway event exists, a length of the roadway event, and an offset from a reference node of the starting link; wherein the subset of links does not include any links that are not immediately subsequent to a turn;

decode a map location from the broadcasted roadway message using a map database; and displaying the decoded map location and the roadway description.

10. The apparatus of claim 9, wherein the subset of links includes the starting link and does not include the one or more links that are not immediately subsequent to a turn for which there is a change of direction less than a predefined threshold angle.

11. The apparatus of claim 9, wherein the at least one memory and computer program code are configured to cause the apparatus to further perform:

update the map database with the roadway description; and generate a route using the updated map database.

12. The apparatus of claim 11, wherein the roadway description indicates a construction event; wherein a travel time to traverse the construction event is increased.

13. The apparatus of claim 11, wherein the roadway description indicates a road closure; wherein the route is generated without using one or more links in the set of links on which the roadway event exists.

14. The apparatus of claim 9, wherein generating an image includes highlighting the set of links on which the roadway event exists.

15. The apparatus of claim 9, wherein generating an image includes generating an icon next to the set of links on which the roadway event exists.

16. A method comprising:

receiving a broadcasted roadway message, wherein the broadcasted roadway message including a roadway description and a location reference, wherein the location reference comprises a subset of links of a set of links, a length of the roadway event, and an offset from a reference node of a starting link, wherein the subset of links includes a starting link and does not include other links in the set of links that are not immediately subsequent to a turn;

decoding a map location from the broadcasted roadway message using the map database; and displaying an image including the decoded map location and the roadway description.

17. The method of claim 16, further comprising:

updating the map database with the roadway description; and generating a route using the updated map database.

18. An apparatus comprising:

at least one processor; and at least one memory including computer program code for one or more programs; the at least one memory and the computer program code configured to, with the at least one processor, cause the apparatus to at least perform:

determine a roadway event, the roadway event including a roadway description and a roadway location;

generate a roadway message, the roadway message including the roadway description and a location reference, wherein the location reference comprises a subset of links of a set of links that comprise the roadway location, a length of the roadway event, and an offset from a reference node of a starting link, wherein the subset of links includes a starting link and does not include other links in the set of links that are not immediately subsequent to a turn; and broadcast the roadway message.

19. The apparatus of claim 18, wherein the location reference further includes a link type; wherein if the link type is a first type then the offset is zero and the subset of links only includes the starting link; if the link type is a second type the offset is non-zero then the subset of links only includes the starting link; and if the link type is a third type, the subset of links includes two or more links, one of the links being the starting link.

* * * * *